Dec. 26, 1922.
G. T. O'DONNELL.
HARVESTING MACHINE
FILED MAR. 8, 1921.
1,440,168
2 SHEETS-SHEET 1
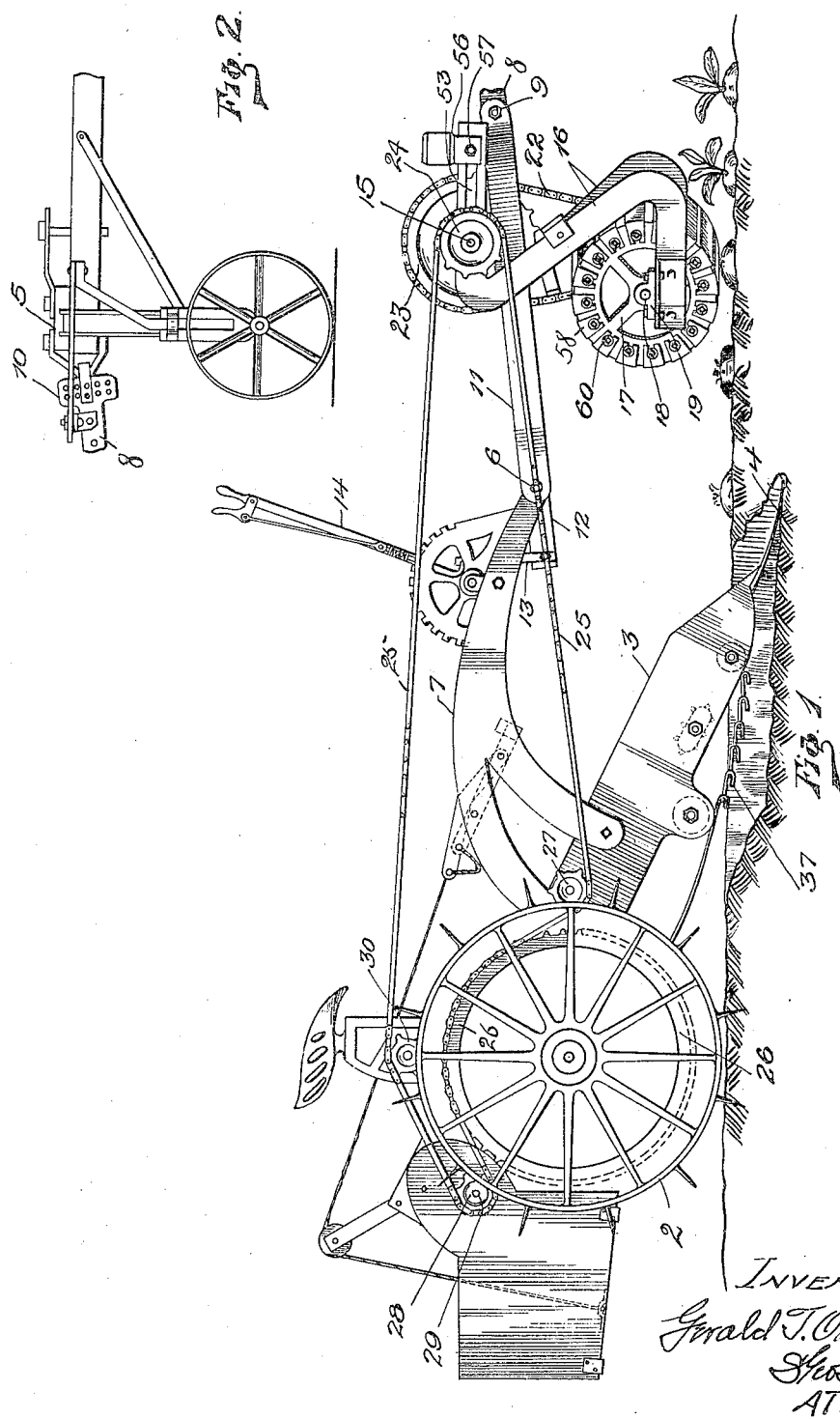

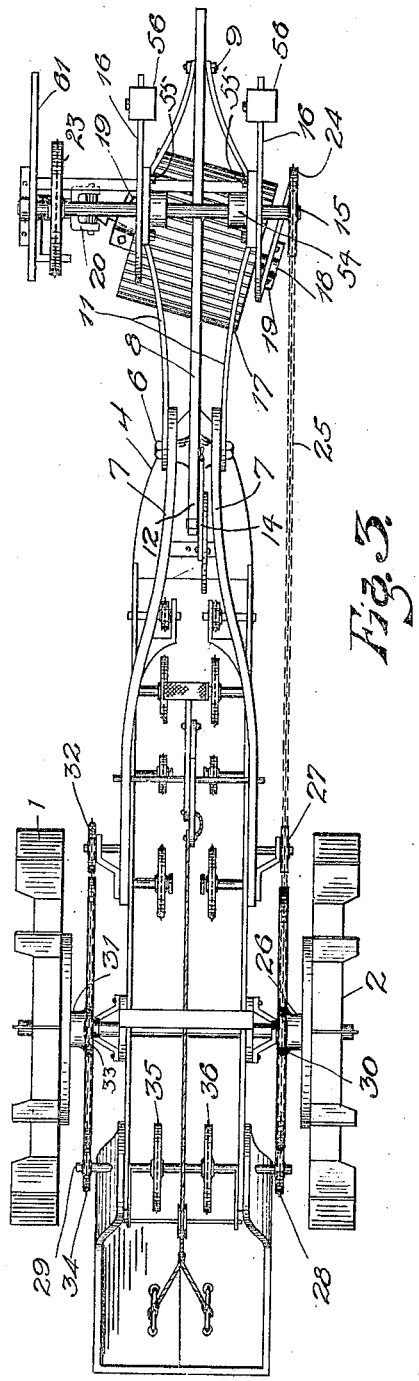
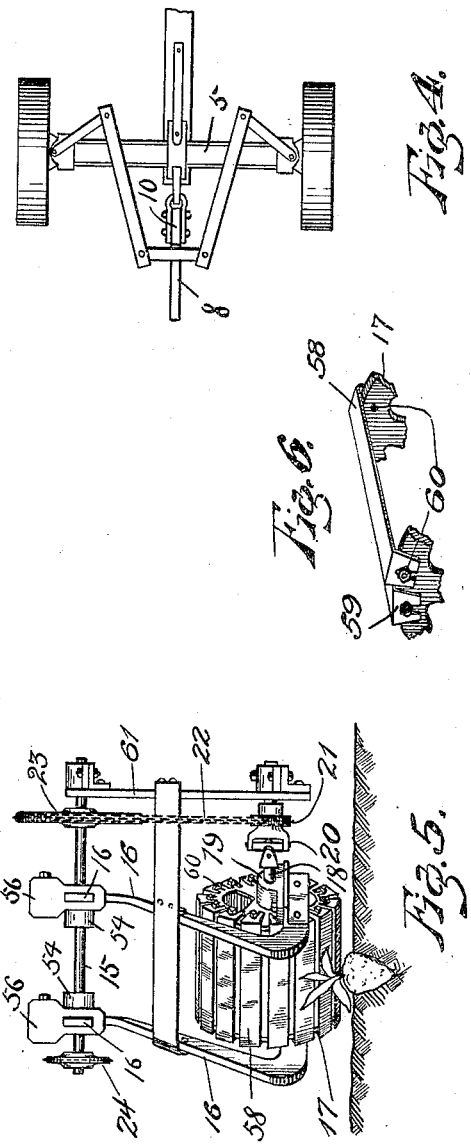

Patented Dec. 26, 1922.

1,440,168

UNITED STATES PATENT OFFICE.

GERALD T. O'DONNELL, OF CHICAGO, ILLINOIS.

HARVESTING MACHINE.

Application filed March 8, 1921. Serial No. 450,694.

*To all whom it may concern:*

Be it known that I, GERALD T. O'DONNELL, a citizen of the United States, residing at Chicago, in the county of Cook and State of Illinois, have invented certain new and useful Improvements in Harvesting Machines, of which the following is a specification, reference being had therein to the accompanying drawing.

This invention relates to beet harvesting machines and has for its object to produce a simple and efficient machine of this character.

Other objects and advantages of the peculiar construction will appear in the further description of the invention.

In the accompanying drawings forming part of this application and in which like reference characters indicate like parts:

Figure 1 is a side elevation of the principal portion of the machine;

Figure 2 is a similar view of the forward detachable chassis which supports the front end of the machine and to which the draft means are applied, either animal or mechanical, as desired.

Figure 3 is a top plan view of Figure 1 with the inclined conveyor of the machine omitted, Figure 4 is a top plan view of Figure 2, Figure 5 is a front elevation of the topping roller and its operating mechanism, and Figure 6 is a perspective view of a fragmental portion of the topping drum showing the relative position of the knives thereupon.

My present invention resides not in the details of the complete assemblage shown, as the major portion of the mechanism is that well known as a common potato digger comprising the two spaced traction wheels 1 and 2, the forwardly and downwardly inclined conveyor illustrated at 3 having the digging point 4 attached thereto which plows along in the ground under the potatoes or other vegetables being harvested when the machine is being operated, the forward end of such machine being supported upon the separable two wheeled sulky or chassis indicated at 5. This chassis is usually pivotally connected to the forward end of the digger proper at the point indicated at 6 in the forwardly projecting and upwardly arched frame 7 of the digger chassis.

In applying my invention to this device I have materially changed portions of the assemblage thereof, as for example, the placing of the separable chassis 5 some considerable distance forwardly of the digger and installing between the latter and the chassis a novel form of topping mechanism, which is mechanically operated from the driving mechanism of the digger. These novel features I will now proceed to describe, and, subsequently point out in the annexed claims together with those covering the novel combination of digger.

6 represents a pivotal point, or shaft, transverse the forward end of the frame 7 of the chassis of the digger proper and this frame comprises a fabricated metal structure with the two members 7—7 spaced apart and between which, upon the pin 6, is pivotally supported one end of the forwardly extending beam 8. Upon each side of the beam 8 and spaced therefrom is a reinforcing member 11 which members in combination with said beam form a fabricated supporting structure for the topping device, which will be described later. The inner end 12 of the beam 8 extends some distance beyond the shaft 6 towards the digger and is pivotally connected by a suitable link 13 to the manually operated lever 14 which is common to such diggers and by the manipulation of which the ground engaging end of the digger may be raised and lowered as desired; this being the same action and result which takes place when the beam 7 is directly connected with the sulky chassis; thus in this combination it is evident that when the inner end 12 of the beam 8 is raised or lowered, it will also raise or lower the topping device which is carried upon said beam and its cooperative structure.

Upon this intermediate support, composed of the beam 8 and side members 11, is supported in any desired manner the rotatable transverse shaft 15, and, upon this shaft, are carried two spaced S-shaped members 16 which depend one upon each side of the intermediate frame and carry, suspended intermediate of their lowermost rearwardly extending ends, the topping drum 17, the latter being mounted upon a suitable shaft 18 journalled in boxes 19 carried upon the upper edges of the ends of the S-shaped members. The drum 17 is non-rotatably fixed to the shaft 18 and said shaft extends beyond one of the S-shaped members at one end where it has installed therein a universal coupling 20 and carries thereupon a sprocket wheel 21 which is driven by a suitable sprocket chain 22 extending upwardly and about a larger sprocket wheel 23 fixed to the shaft 15. Outside of the sprocket wheels 21 and 23 is a depending supporting arm 61 which forms a part of the topping frame structure, the outer end of the shaft 18 being journalled in the lower portion thereof and the end of the shaft 15 being journalled in the upper portion thereof. The shaft 15 has imparted rotary motion thereto by its having a smaller sprocket wheel 24 fixed upon the opposite end thereof cooperatively engaged by the sprocket chain 25 leading from the digger proper in the rear thereof, said chain being engaged with the upper portion only of a suitable master or driving sprocket wheel 26 mounted on the bull wheel 2 of the digger. For properly holding the sprocket chain 25 in engagement with the master sprocket wheel 26, there is installed an idling sprocket wheel 27 in front of the sprocket 26 and just above the center thereof under which the lower portion of the sprocket chain 25 passes, thence up over the master sprocket 26 to the rear thereof when it leaves said sprocket and passes about a second smaller sprocket 28 mounted upon the transverse shaft 29, thence upwardly and forwardly over the idling sprocket wheel 30, from where it leads forwardly to the sprocket 24, making an endless driving sprocket chain as is obvious, and by the operation of which the topping mechanism is actuated simultaneously with the digger.

Upon the opposite bull wheel 1 is mounted a master sprocket wheel 31, similar in all respects to the sprocket wheel 26 and which has cooperatively associated therewith three sprocket wheels 32, 33 and 34 in the same relation thereto as the sprocket wheels 27, 28 and 30; the sprocket 34 being attached to the shaft 29, thus furnishing rotative power to said shaft from the bull wheel 1 in a like manner to that in which power is furnished from the bull wheel 2 through the sprocket 28 to said shaft. This shaft 29 has mounted thereupon two spaced sprockets 35 and 36 within the frame structure of the digger, which sprockets operate the inclined conveyor belt 37 of the digger, the detailed description of which will not be entered into in this specification as the same is not deemed essential to a comprehensive understanding of the invention and the operation of said diggers is well known to those versed in the art; but suffice it to say that the discharge of said belt is at the rear of the machine and at the point where the belt passes over and downwardly about the sprockets 35 and 36.

The lowermost rearwardly extending ends of the S-shaped members 16 of the topping mechanism are bent sidewise out of alignment with the upper forwardly extending ends, but are parallel horizontally therewith. This positioning of the topping drum 17 is what necessitates a universal joint 20 in the shaft thereof and also results in an angular approach of the knives of the topping drum to the beets as it engages same which results in a cleaner and less abrupt cutting action thereof and also serves to brush or throw the beet tops off to one side of the row of topped beets so that the digging machine does not gather the tops with the beets.

The upper forwardly extending ends of the S-shaped members 16 have horizontally disposed slots 53 therein through which the journal boxes 54 are rigidly but adjustably attached by suitable through bolts 55 extending within said slots and by this mounting upon the shaft 15 it is understood that the topping roller is pivotally suspended, that is to say, it has a free pendulum like action fore and aft of the machine.

Upon the forward end of each S-shaped member is mounted an adjustable counter weight 56 which may be moved back and forth as desired and held in position by a suitable set screw 57. By this arrangement it is evident that if the S-shaped members are placed forwardly upon the shaft 15 to their extreme limit and the weights 56 in their extreme foremost position, the roller will have a tendency to heel up somewhat and engage the tops of the beets less forcibly than if the counter weights were inward on the arms 16 towards the shaft 15, and that by this pendulum like suspension of the topping roller, the same may be very delicately adjusted in keeping with the class of work to be performed; which results in the beets being equally topped irrespective of the irregularity in their projection above the ground, as the topping roller, being free to rise and lower, will engage each beet with substantially the same pressure.

The topping roller 17 is composed of two spaced heads, preferably having open spaces in the ends thereof, as shown in Fig. 1 of the drawings, and a continuous circumferential vertical rim upon which are mounted the flat cutting blades 58, having their ends turned at right angles and bifurcated as at 59. These cutting blades are held in position by suitable bolts 60 passing through the bifurcated ends of the knives and the adjacent portion of the rim of the drum heads, the bolts having suitable nuts and washers to properly impinge upon the ends of the blades. By this connection it is evident that the blades may be tipped at any desired angle, as shown in Figure 6 of the drawings, and there securely held in order to regulate the depth of cut when engaging the tops of the beets. It will be noted that the rotary motion imparted to the topping drum is in the reverse direction to that of the wheels of the digger and that the speed of such rotation may be governed by the size of the various sprocket wheels which convey same.

From the foregoing it is evident that I have devised a practical and efficient beet harvesting machine by combining a rotary topping device within a common mechanical digging machine and one that is susceptible of delicate adjustment to accommodate varying conditions and which will uniformly top the beets being harvested irrespective of their varying conditions above the ground.

Having thus described my invention, what I claim and desire to secure by Letters Patent is:

1. A rotary topper for beet harvesting machines of the class described comprising a shaft supported in the upper portion of the machine and forwardly thereof, a depending swinging frame suspended from said shaft, a rotatable topping drum carried in the lower end of the frame, knives adjustably carried upon the drum, and means for operating the topper from the traction of the machine.

2. A rotary topper for beet harvesting machines of the class described comprising a rotatable topping drum, means for supporting said drum diagonally of a row of beets to be topped, and knives adjustably carried upon the drum for regulating the depth of cut of said knives.

In testimony whereof I hereunto affix my signature in the presence of two witnesses.

GERALD T. O'DONNELL.

Witnesses:
F. S. WILLIAMS,
KENNETH M. WISHART.